United States Patent
Tu

(10) Patent No.: US 8,190,907 B2
(45) Date of Patent: May 29, 2012

(54) PROCESS AND APPARATUS FOR AUTOMATICALLY IDENTIFYING USER OF CONSUMER ELECTRONICS

(75) Inventor: Edgar A. Tu, Castro Valley, CA (US)

(73) Assignee: Sony Computer Entertainment Inc., Foster City, CA (US)

(*) Notice: Subject to any disclaimer, the term of this patent is extended or adjusted under 35 U.S.C. 154(b) by 743 days.

(21) Appl. No.: 11/244,445

(22) Filed: Oct. 4, 2005

(65) Prior Publication Data

US 2007/0079137 A1    Apr. 5, 2007

Related U.S. Application Data

(63) Continuation-in-part of application No. 10/917,088, filed on Aug. 11, 2004, now abandoned.

(51) Int. Cl.
G06F 21/00 (2006.01)
(52) U.S. Cl. .......................................... 713/186; 726/18
(58) Field of Classification Search .................. 713/186; 726/17, 18, 19
See application file for complete search history.

(56) References Cited

U.S. PATENT DOCUMENTS

| | | | |
|---|---|---|---|
| 6,256,019 B1 * | 7/2001 | Allport | 345/169 |
| 6,359,661 B1 * | 3/2002 | Nickum | 348/734 |
| 6,690,391 B1 | 2/2004 | Proehl et al. | |
| 7,051,351 B2 * | 5/2006 | Goldman et al. | 725/34 |
| 7,120,590 B1 * | 10/2006 | Eisen et al. | 705/14 |
| 7,174,567 B2 * | 2/2007 | Keramane | 726/26 |
| 7,630,986 B1 * | 12/2009 | Herz et al. | 1/1 |
| 2001/0030644 A1 * | 10/2001 | Allport | 345/173 |
| 2002/0012445 A1 * | 1/2002 | Perry | 382/100 |
| 2002/0046104 A1 * | 4/2002 | Kaddeche et al. | 705/14 |
| 2002/0048460 A1 * | 4/2002 | Kitawaki | 396/429 |
| 2002/0059588 A1 * | 5/2002 | Huber et al. | 725/35 |
| 2002/0081005 A1 | 6/2002 | Black | |
| 2003/0001907 A1 | 1/2003 | Bergsten et al. | |
| 2003/0028871 A1 * | 2/2003 | Wang et al. | 725/9 |

(Continued)

FOREIGN PATENT DOCUMENTS

JP    2002-287950    10/2002

(Continued)

OTHER PUBLICATIONS

Chen et al., "A music recommendation system based on music data grouping and user interests", Conference on Information and Knowledge Management, Proceedings of the tenth international conference on Information and knowledge management, Session: Collaborative Filtering and Algorithms, pp. 231-238,Year of Publication: 2001, ISBN:1-58113-436-3.*

(Continued)

*Primary Examiner* — Hadi Armouche
(74) *Attorney, Agent, or Firm* — Joshua D. Isenberg; JDI Patent

(57) ABSTRACT

Consumer devices and methods for operating consumer devices are disclosed. A consumer electronic device may include user identification unit incorporated into a control module of the device. A user of a consumer electronics device is uniquely identified using a metric that is contingent upon the user using the device normally. Content that depends on the user's identity can be provided to or from the device. The user may be uniquely identified using a biometric sensor to provide the metric. The content provided to or from the device or other performance characteristics of the device may be tailored to the particular user based on the user's identity.

44 Claims, 4 Drawing Sheets

U.S. PATENT DOCUMENTS

| | | | |
|---|---|---|---|
| 2003/0095149 A1 | 5/2003 | Fredriksson et al. | |
| 2003/0169302 A1 | 9/2003 | Davidsson et al. | |
| 2004/0073684 A1* | 4/2004 | Jodra et al. | 709/228 |
| 2004/0073803 A1* | 4/2004 | Keramane | 713/186 |
| 2004/0085300 A1* | 5/2004 | Matusis | 345/173 |
| 2005/0130728 A1 | 6/2005 | Nguyen et al. | |
| 2005/0157910 A1 | 7/2005 | Boyd et al. | |
| 2005/0165941 A1* | 7/2005 | Eytchison et al. | 709/231 |
| 2005/0166153 A1* | 7/2005 | Eytchison et al. | 715/747 |
| 2006/0064495 A1 | 3/2006 | Tu | 709/228 |
| 2007/0073686 A1* | 3/2007 | Brooks et al. | 707/6 |

FOREIGN PATENT DOCUMENTS

| | | |
|---|---|---|
| JP | 2002-543487 | 12/2002 |
| JP | 2003331183 | 11/2003 |
| JP | 2004297406 A | 10/2004 |
| JP | 2005107258 | 4/2005 |
| JP | 2005157894 | 6/2005 |
| WO | WO0058934 A1 | 10/2000 |
| WO | WO0058947 A1 | 10/2000 |
| WO | WO 00/65429 | 11/2000 |
| WO | WO 03/003180 | 1/2003 |
| WO | WO 03/021916 | 3/2003 |
| WO | 2004109454 | 12/2004 |

OTHER PUBLICATIONS

Grigorovici et el., "Experiencing Interactive Advertising beyond Rich Media of Ad Type and Presence on Brand Effectiveness in 3D Immersive Virtual Environment", Journal of Interactive Advertising, vol. 5, No. 1, Fall 2004.*

Definition of "personal information"—BusinessDictionary.com. Retrieved on Apr. 27, 2010.*

Microsoft Mouse and Keyboard Hardware—Wireless IntelliMouse® Explorer with Fingerprint Reader, downloaded from the Internet, , downloaded from: <http://www.microsoft.com/hardware/mouseandkeyboard/productdetails.askx?pid=035>, downloaded on Aug. 26, 2005.

International Search Report and Written Opinion of the International Searching (Authority dated Jul. 14, 2008—International Patent Application No. PCT/US06/ 37337.

Ross Cantanzariti, "Microsoft Fingerprint Reader" In PC World, Nov. 11, 2005. Downloaded from the Internet Mar. 2, 2009. Downloaded from <http://www.pcworld.idg.com.au/index.php/taxid;2136212710;pid;1017;pt;1)>.

Definition of "personal information"—BusinessDictionary.com—http://www.businessdictionary.com/definition/personal-information.html. Download on Apr. 27, 2010.

European Search Report dated Jun. 30, 2010 issued for European Patent Application No. 06815384.0.

Japanese Office Action issued for Japanese Patent Application No. 2008-534562 dated Apr. 12, 2011.

Japanese Office Action issued for Japanese Patent Application No. 2008-534562 drafted Aug. 2, 2011 and dispatched Aug. 9, 2011.

* cited by examiner

PROCESS AND APPARATUS FOR AUTOMATICALLY IDENTIFYING USER OF CONSUMER ELECTRONICS

CLAIM OF PRIORITY

This application is a continuation-in-part of and claims the benefit of priority of U.S. patent application Ser. No. 10/917,088, filed Aug. 11, 2004, now abandoned.

FIELD OF THE INVENTION

This invention is directed to consumer electronic devices and more particularly to methods and apparatus for uniquely identifying device users for the purposes of providing user-specific content.

BACKGROUND OF THE INVENTION

Consumer electronic devices are increasingly being used in conjunction with web-based applications. Such devices include personal computers, personal digital assistants, cellular phones, televisions and video game modules. Because of the near-ubiquity of such devices, there is a tremendous potential market for advertising of goods and services via these devices. However, most web-based advertising is largely unfocused due to a lack of information about the person who uses the device. Advertising could be more focused if it could be targeted to the specific interests of device users. Information about the users is typically obtained through some form of querying the device user. Typically, the user is asked to provide information when registering the device or when signing up for an online service. Information can also be obtained by monitoring device use. For example, an online game provider can monitor which games are accessed by a particular device registered to a known user. However, many consumer electronic devices, such as video game consoles, often have multiple users, e.g., members of the same family. These users may be different from the individual who registered the device. Unfortunately, currently existing technology only allows content providers to track the device and cannot distinguish among different users of a device.

In the prior art security systems for device such as personal computers have used biometric sensors such as fingerprint sensors as alternatives to entering a password. However, such security systems are not contingent on the identity of the user while the user is using the device. Instead, the user is only identified at when the user starts up the device. Once the device starts up, anyone can use the device. Such prior art security systems are, therefore, easily circumvented.

Thus, there is a need in the art, for methods and apparatus that overcome the above disadvantages.

SUMMARY OF THE INVENTION

To overcome the above disadvantages, embodiments of the invention are directed to consumer devices and methods for operating consumer devices. According to embodiments of the invention a user of a consumer electronics device is uniquely identified using a metric that is contingent upon the user using the device normally. Content that depends on the user's identity can be provided to or from the device. According to certain embodiments, a user may be uniquely identified using a biometric sensor to provide the metric. Examples of suitable biometric sensors include fingerprint sensors, hand sensors, face recognition systems, iris scanners retinal scanners, voice pattern analyzers, and DNA analyzers. The biometric sensor senses a user biometric during normal operation of the device by the user. In certain embodiments of the invention a user identification unit incorporated into a control module of the device.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to embodiments of the invention a consumer electronic device has incorporated within it a control module (implemented, e.g., in hardware and/or software) that allows the device to uniquely identify each user of the device so that content based on the user's identity can be presented to or received from the user.

The control module can be a remote unit or can be incorporated into the device itself. The control module includes a sensor positioned such that it can obtain a metric that identifies the user during normal device use. Thus instead of requesting the user entering a password or biometric in response to a request to verify identity, the sensor obtains the metric as the user uses the device normally. The integration of the biometric sensor into control module allows the device to uniquely identify the user who is actually using the device.

As used herein, the terms "using a device normally" and "normal use of a device" refer to use of a device for its intended purpose without having to perform a separate step, function, or operation for the express purpose of identifying the user. By way of example and without limitation, if the device is a camera, normal use of the camera would include taking pictures with the camera. In the case of a video game, normal use would include playing the game, pausing or saving a game, selecting game options, and the like. In the case of a computer mouse, normal use would include pressing the mouse button, for "click" and "drag" operations that are incidental to use of a particular program. If the program is a web-browser normal use includes clicking on web links to navigate the internet. Examples of a "step, function, or operation for the express purpose of identifying the user" include entering a password or biometric in response to a request for user identification.

The content provided to or from the device or other performance characteristics of the device may be tailored to the particular user based on the user's identity. As used herein, the expression "tailored to the particular user" generally means that the operation of the device is in some way different for a particular user than for other users. By way of example, and without limitation, if the device is a digital camera, the device may tailor its operation to a particular uniquely identified user by automatically storing pictures taken by that user in a folder associated with that user.

Figure 1:
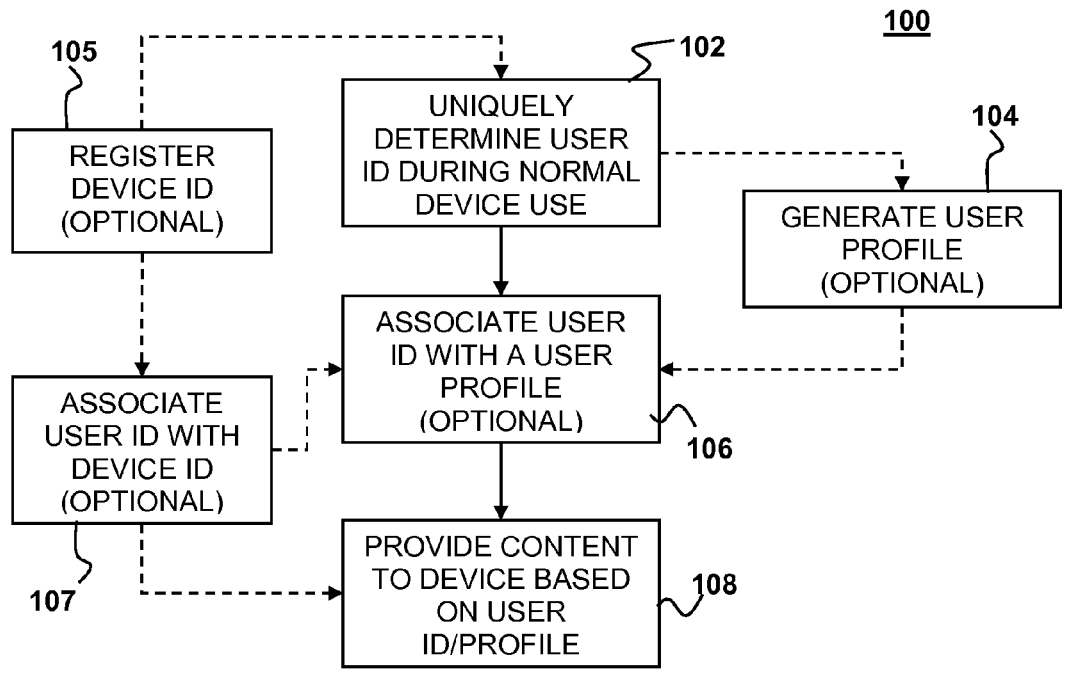
FIG. 1 is a flow diagram illustrating operation of a consumer electronic device according to an embodiment of the present invention.
Figure 2:
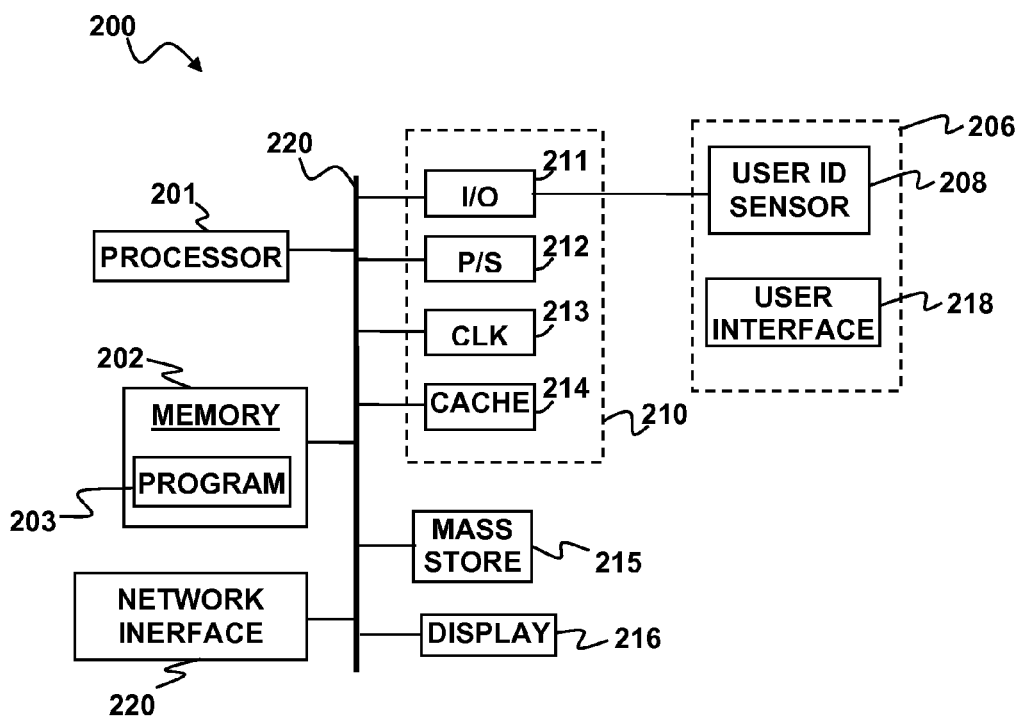
FIG. 2 is a block diagram illustrating a consumer electronic device according to an embodiment of the present invention.

Embodiments of the present invention may be understood by simultaneously referring to FIG. 1 and FIG. 2. FIG. 1 depicts a flow diagram of a method 100 of the basic operation of a consumer electronic device according to an embodiment of the present invention. As depicted in FIG. 2, a consumer electronic device 200 may include a processor 201 and a memory 202. The processor may be a microprocessor or microcontroller chip of a type commonly used in consumer electronic devices, e.g., a PIC microcontroller from Microchip Technology, Inc. of Chandler, Ariz. The memory 202 may be in the form of an integrated circuit, e.g., RAM, DRAM, ROM, and the like). A computer program 203 may be stored in the memory 202 in the form of processor readable instructions that can be executed on the processor 201. The instructions of the program 203 may include the steps of the method 100 as depicted in FIG. 1 and described herein. The device 200 may further include a control module 206. The control module may be mechanically mounted to or physically incorporated into the device 200. Alternatively the control module 206 may be a remote unit that interacts with the rest of the device 200 via a communication link, which may be a cable or wireless link.

The device 200 may also include well-known support functions 210, such as input/output (I/O) elements 211, power supplies (P/S) 212, a clock (CLK) 213 and cache 214. The device 200 may optionally include a mass storage device 215 such as a disk drive, CD-ROM drive, tape drive, or the like to store programs and/or data. The device 200 may also optionally include a display unit 216 and user interface unit 218 to facilitate interaction between the device 200 and a user. The display unit 216 may be in the form of a cathode ray tube (CRT) or flat panel screen that displays text, numerals, graphical symbols or images. The user interface 218 may include a keyboard, mouse, joystick, light pen or other device. As shown the particular example depicted in FIG. 2, the user interface 218 may be incorporated into the control module 206. The device 200 may also include a network interface 220 to enable the device to communicate with other devices over a network, such as the internet. These components may be implemented in hardware, software or firmware or some combination of two or more of these.

Referring again to FIG. 1, at step 102 a user is uniquely identified during normal device use. To facilitate such user identification, the device 200 may include a user ID sensor 208, which may be incorporated into the control module 206. By way of example, the user ID sensor 208 may be a biometric sensor. The biometric sensor senses a user biometric during normal operation of the device by the user. Examples of biometric sensors include fingerprint sensors, hand sensors, face recognition systems, iris scanners retinal scanners, voice pattern analyzers, or DNA analyzer. There are a number of different ways of incorporating such sensors into the device 200 or control module 206.

Figure 3A:
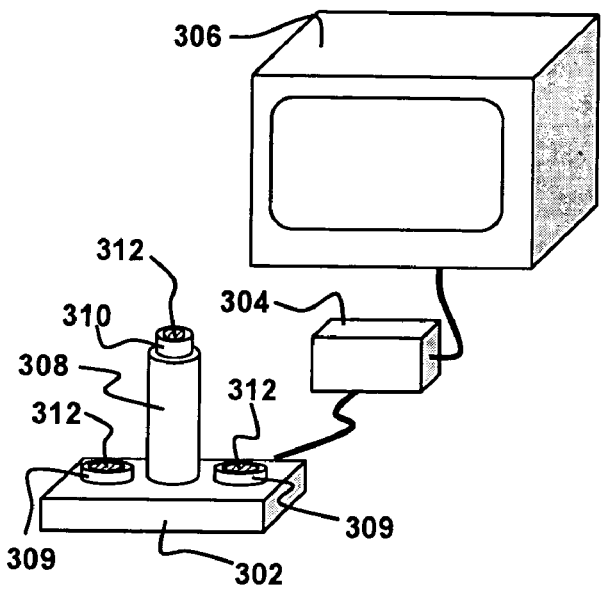
FIGS. 3A-3G depict examples of consumer electronic devices according to embodiments of the present invention.

For example FIG. 3A illustrates an example of an embodiment in which the device is a video game unit 300 and the control module is a joystick controller 302. The game unit 300 may also include a game module 304 that connects to a television monitor 306 in a conventional fashion. The joystick controller includes joystick 308 and control buttons 309, 310. One of the control buttons 310 (referred to herein as the joystick button) may be positioned on the joystick 308 in a position where the user's thumb is likely to be positioned during use of the controller. The buttons 309, 310 retain their ordinary function within the context of the joystick module 302 and game unit 300. However, in addition to these functions, a fingerprint sensor 311 may be incorporated into the joystick button 310. Since only one user uses the joystick 308 at a time and since the user uses the joystick as part of normal use of the game unit 300, such a sensor configuration can uniquely identify the user during normal use of the game unit 300. Suitable fingerprint sensors are commercially available, e.g. TouchChip® and TouchStrip™ silicon-based fingerprint sensors available from UPEK, Inc. of Berkeley, Calif. As an alternative, a fingerprint sensor may be incorporated into the other buttons 309 to achieve the desired user identification. As an alternative to fingerprint sensors, a DNA sensor may be used in which a microneedle draws a small sample of a user's bodily fluid (e.g., blood) and uses the sample to determine a DNA signature that is unique to the user.

Figure 3B:
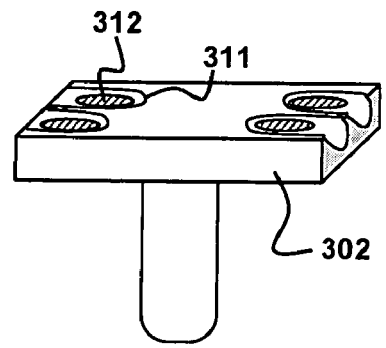

In an alternative embodiment, one or more fingerprint sensors 312 may be placed on the back of a joystick controller 302 as depicted in FIG. 3B. In such a case, it is desirable to place the sensors 312 in locations where the user's fingers are likely to reside during operation of the game. By choosing the location of the sensors 312 in concert with ergonomic design of the joystick controller 302 the user will be more likely to place his fingers where the sensor can sense a fingerprint. For example the joystick controller 302 may include depressions 314 that are shaped to fit a users fingers and the sensor may be located on a surface of one of these depressions. The joystick controller 302 may also be equipped with an inertial sensor 316 that senses movement of the controller unit during game play. By way of example, the sensor 316 may be an accelerometer sensor. By integrating an output of the accelerometer with respect to time one can determine a velocity of the joystick and by integrating the velocity one can determine a displacement. Information about the acceleration and/or velocity and/or displacement can be used to derive information about a particular user's style of play, e.g., whether the user remains sedentary or is physically animated during play.

Figure 3C:
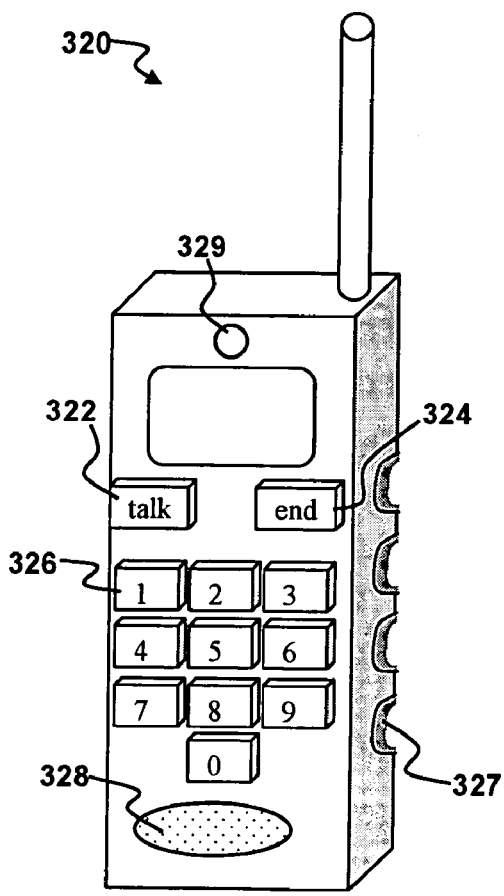

FIG. 3C illustrates an example of biometric sensors incorporated into a telephone unit 320, such as a cordless telephone handset or a cellular phone. Fingerprint sensors may be incorporated into one or more function buttons 322, 324 or numeric keys 326 commonly found on telephone handsets. The telephone unit 320 typically includes a microphone 328. The telephone unit 320 may also include ergonomically designed finger depressions 327 where fingerprint sensors can be located. Alternatively a voice recognition system may be incorporated into software that analyzes voice patterns from a user who speaks into the microphone 328. Such software may run on the telephone unit or may be run on a remote server. Where the phone includes a digital camera 329, the camera may provide an image of the user's face, iris or retina to appropriately configured, facial, iris or retina recognition software running on the telephone unit or on a remote server.

Figure 3D:
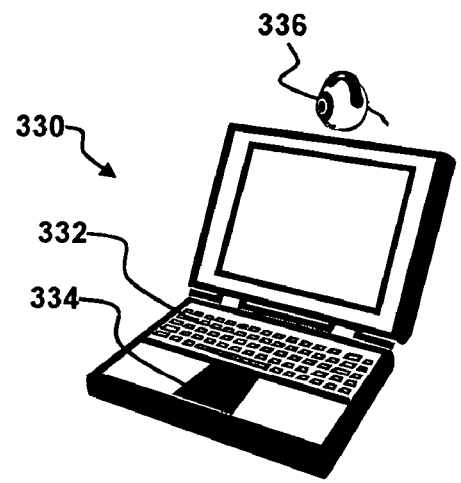
Figure 3E:
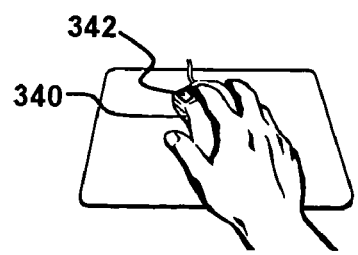

In other embodiments of the invention, fingerprint sensors may be incorporated into the keys of a keyboard 332 on a laptop computer 330 as depicted in FIG. 3D. A fingerprint sensor may also be incorporated into a mouse pad 334 on the computer 330. In addition, a web camera 336 may be used to implement facial, iris, or retinal recognition as described above. A fingerprint sensor 342 may also be incorporated into one or more keys on a computer mouse 340 as depicted in FIG. 3E. An important distinction between embodiments of the present invention implemented on a computer keyboard or mouse and prior art security systems is that in embodiments of the present invention, the sensors 332 identify the user during normal use of the computer. Prior art security systems, by contrast typically only work when a user logs in. The computer can't tell if another user uses keyboard after log on. In embodiments of the present invention, the sensors 332 are positioned to be able to identify the user during ordinary use.

Figure 3F:
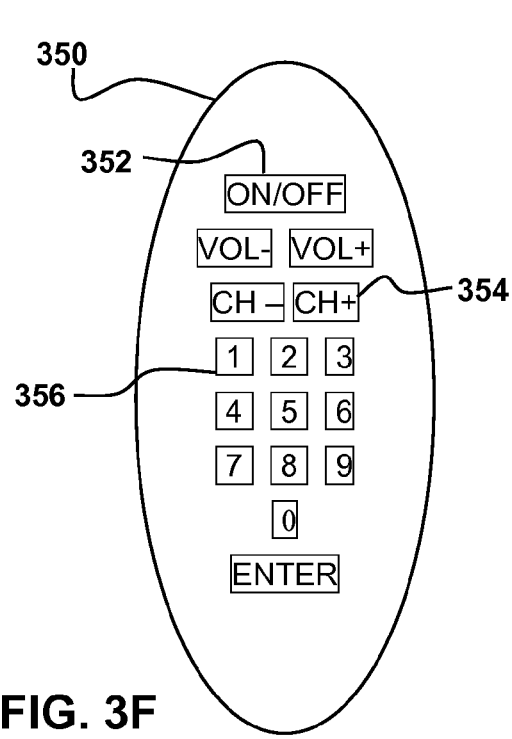
Figure 3G:
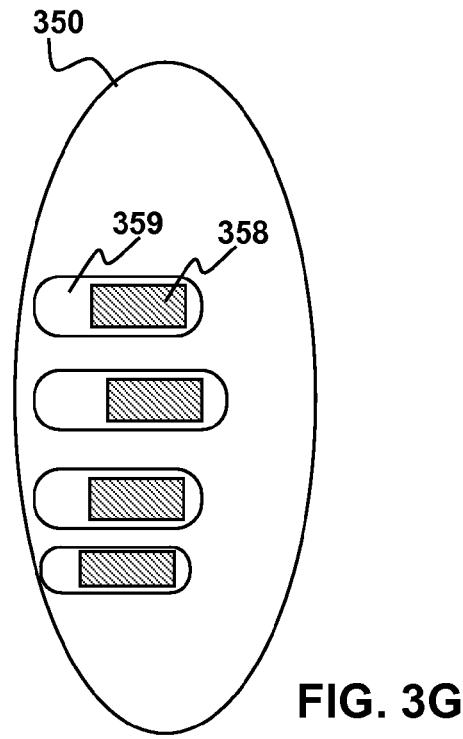

In addition, a fingerprint sensor may be incorporated into function buttons 352, 354 or numeric keys 356 on a remote control unit 350, such as one might use with a television, video cassette recorder (VCR), digital video disk (DVD) player, or other similar consumer electronic device as shown in FIG. 3F. Examples of function buttons include channel or station changing buttons, power buttons, enter buttons, and the like. Fingerprint sensors 358 may also be ergonomically incorporated the back of the remote control unit 350 as shown in FIG. 3G. The sensors 358 are placed in depressions 359 designed to conform to the shape of a user's fingers when holding and operating the remote control unit 350. Placing such a sensor on a television remote control is particularly useful for tracking the viewing habits of individual viewers.

Biometric sensors used as the user ID sensor 206 may generate a digital identifier associated with the user biometric. For example, fingerprint reader devices typically convert a fingerprint image into a hash value that depends on patters within the fingerprint image. Ideally, such a sensor would provide a unique hash for each different fingerprint. However, for the purposes of certain embodiments of the present invention an identification accuracy of about 80-90% is sufficient.

In some embodiments of the present invention, a user profile may be generated at 104. For example, the device may query the user, as is commonly done. Alternatively, user behavior may be monitored and information gleaned from patterns of user behavior may become part of the profile. The profile can be used to tailor the operation of the device to a particular user. For example, where the device is a digital music player that downloads music from the internet, the user profile may contain information about particular artists or musical styles that the user downloads. In the case of a video game console, the user profile may include information about particular types of games (e.g., racing games as opposed to combat-type games) that the user downloads. The user profile information may then be associated with the user ID at 106. For example, the user profile may contain a unique hash generated by the user ID sensor 206. Note that for purposes of providing content, such as pushing advertising. to the identified user it is not necessary to know the user's name, address, phone number or other personal information. It is sufficient to associate patterns of the user's online activity with the identified user.

It is common practice to register a consumer electronic device with the manufacturer for record keeping purposes. Such a registration step 105 may be performed at any time before during or after the user begins using the device 200. Such registration, typically involves associating a device ID with a particular owner of the device. In embodiments of the present invention, the ID for one or more users of the device 200 may be associated with the device ID at step 107.

Once a user ID is associated with a user profile, the user can be identified when he uses the device 200. Information from the user profile can then be used in the selection of content that can be provided to the user. Such content can be provided remotely, e.g., over a network, or locally, e.g., through compact disks or other media in the mass storage device 215. In the case of locally provided content or network-provided content, the user ID can serve to determine whether a particular user should be denied access to particular content. For example, if the user is a child, a parent may configure the program 203 to deny the child access to certain content such as television programs, websites, downloaded videos or music, email, electronic documents or folders and the like.

Figure 4:
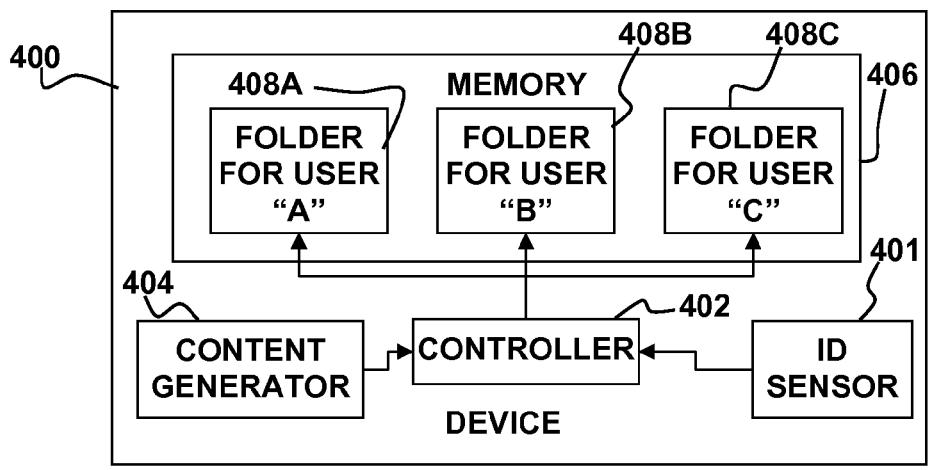
FIG. 4 is a block diagram of a consumer electronic device according to an alternative embodiment of the present invention.

As an example of providing locally generated content based on user ID, FIG. 4 depicts an example of how a consumer electronic device 400 may be configured to separate out user generated content according to which user created the content. The device 400 includes an ID sensor 401 coupled to a controller 402, such as a microcontroller. The controller 402 is also connected to a content generator 404, which may be implemented in hardware, firmware, software or a combination of two or more of these, and a memory 406. When a user "A" generates content with the device, the ID sensor 401 provides the controller with a unique user ID associated with user "A". The ID sensor 401 provides the controller 402 with other different user ID's for other users "B" and "C" when they generate content with the device 400. By associating each unique user ID with the corresponding content generated by the users, the controller 402 can sort the content to different folders 408A, 408B, 408C for the different users "A", "B", "C". When user A later wants to access his content, he can easily find it since it has already been separated from the content generated by users B and C.

Figure 5:
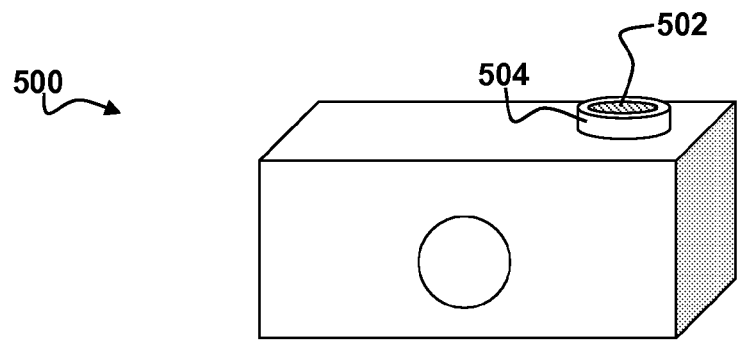
FIG. 5 is a 3-dimensional schematic diagram of a camera according to an embodiment of the present invention.

By way of example, and without loss of generality, the device 400 may be a digital camera 500 as depicted in FIG. 5. In this example, different users of the camper 500 generate content by taking digital pictures. Conventional components of the digital camera involved in taking pictures, e.g., lenses, flash, electronic imaging device, imaging software, and the like provide the content generator function. The digital camera 500 has a fingerprint sensor 502 incorporated into a shutter button 504. Since the user who takes a picture is normally the person whose finger presses the shutter button 504, the camera 500 can separate different user's pictures into different folders. Thus, the operation of the camera can be tailored based on the identity of the user of the camera.

Figure 6:
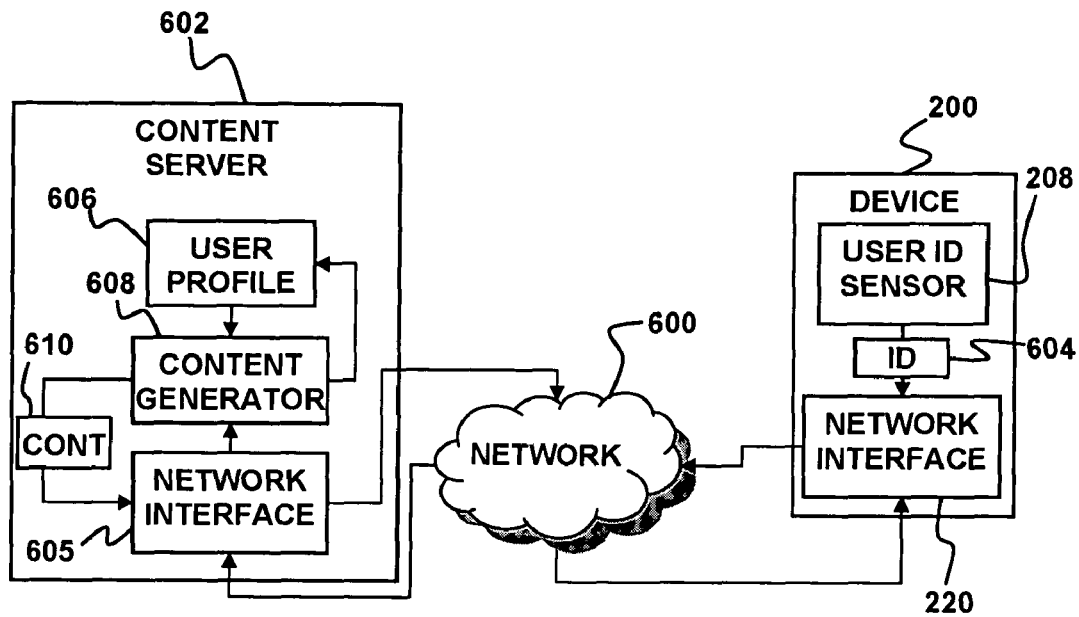
FIG. 6 is a block diagram illustrating operation of a consumer electronic device over a network according to an embodiment of the present invention.

In embodiments of the present invention content may be provided to the device 200 from a remote source. For example, as depicted in FIG. 6, the device 200 may be connected to a network 600 through the network interface 220. One or more content servers 602 may also be connected to the network 220. When the device 200 accesses the network 600 it signals its presence to a content server 602 via the network 600. A user ID 604 generated by the user ID sensor 208 can be transmitted over the network to the content server 602 through a network interface 605. The content server 602 may also receive information about a user's preferences and registration information about the device 200. This information can be stored in a user profile 606 on the content server 602 along with profiles for other users. The other users may be users of the same device or users of different devices. In alternative embodiments, the user profile 606 may be stored on a proxy server 603 or stored locally in the memory of the device 200. When a user connects to the network 600 with the device 200 the content server 602 uses the user ID 604 and a content generator 608 located at the content server 602. The content generator 608 may be implemented in hardware, software, firmware or some combination of two or more of these. Using information from the user profile 606, the content generator 608 generates content 610 that is tailored to the particular user associated with the user ID 604. The content 610 can be submitted to the device 200 via the network interface 605 and the network 600.

Examples of providing user content over a network include "pushing" advertising to the user based on the user's patterns of use of the device 200. For example, if the device 200 is used for downloading and playing music or videos, the content generator 608 may include a recommendation engine that suggests music or videos for the user to download. If the device 200 is used for online gaming, the content generator 608 can tailor in-game advertising to the particular user and then push the advertising to the game in the form of textures appearing within the context of the game. In the case of a television set, the content generator 608 may generate text bubbles containing context-sensitive content that can be pushed to the user during live broadcasts based on his or her viewing preferences or even based on the user's preferences for music or videos as determined from his or her use of other devices having unique user ID capability. If the device 200 is a computer browsing the internet, the content generator 608 may include a recommendation engine that selects banner ads based on the user's web-browsing habits and displays them on websites that the user visits.

Embodiments of the invention can be used to prevent unauthorized sharing of online accounts. A biometric identifier, such as a fingerprint ID, that is generated during ordinary use of the online content allows the content server 602 to determine whether a user attempting to access an online account is the user associated with that account.

An additional problem associated with delivering content online is one of preventing illegal copying or distribution of downloaded content. The internet provides enormous opportunities for mass delivery of electronically generated content such as music, movies, literature, computer software, computer games and the like. However, the internet also presents equally enormous opportunities for unauthorized copying and distribution of such content. Currently, when a user downloads content purchased content it is difficult if not impossible to prevent unauthorized copying and distribution of that content. One technique for doing so is to "lock" the download to the user's machine so that the downloaded content may only be accessed on that particular machine. However, if the user sells the machine, he cannot transfer the downloaded content that he has already paid for. By associating content with an authorized user, each download may be made unique so that only the authorized user (e.g., one who has paid for the content) will be able to access it. Such a technique may be used to prevent hacking or copying to steal music, software, video games or other copyrighted content.

Figure 7:
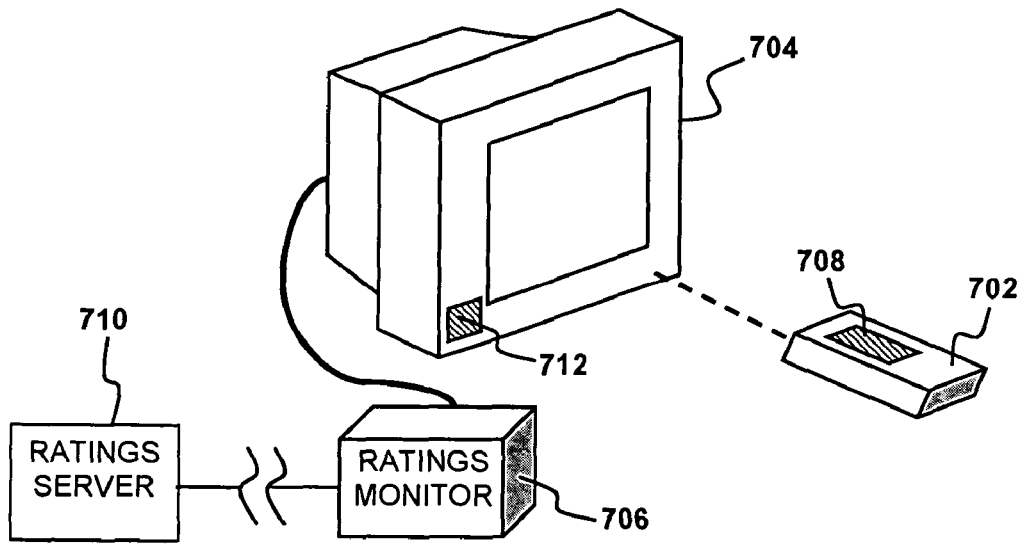
FIG. 7 is a schematic diagram illustrating implantation of a ratings system according to an embodiment of the present invention.

In addition to providing content to the user, embodiments of the present invention are also useful in obtaining content from the user. For example, as depicted in FIG. 7 the device 200 may be a remote control 702 for a television 704 used in association with an electronic television ratings monitor unit 706, which may be connected to a remote ratings service server 710. A biometric sensor 708 incorporated into the remote control 702 allows the ratings monitor unit 706 to provide the server 710 with information associating television viewing habits with individual viewers. A similar sensor 712 may also be placed on a control panel on the television set 704. The sensor 712 may be incorporated into a standard control normally accessed by a user of the television set 704. Examples of such controls include on/off buttons, volume controls, channel controls and the like. This information can be more valuable to a ratings service that information about the viewing habits of the household in which the monitoring unit is installed. The biometric sensor allows the monitor unit 706 and/or server 710 to associate demographic information about individual viewers of the television 704 with their viewing habits. Such demographic information may be uploaded during an initial installation of the monitoring unit.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for operating a consumer electronic device, comprising:

uniquely identifying a user of the device using a metric that is contingent upon the user using the device for its intended purpose without having to perform a separate step, function, or operation for the express purpose of identifying the user, wherein uniquely identifying the user includes using a biometric sensor to provide the metric by generating a digital identifier associated with a user biometric, wherein using the biometric sensor includes sensing a user biometric with the biometric sensor during normal operation of the device; and providing context sensitive content to the device, wherein the context sensitive content depends on the user's identity, wherein providing the context sensitive content includes pushing the context sensitive content to the user based on the user's patterns of use of the device without requiring the user's personal information, wherein the context sensitive content is presented during a broadcast on a display associated with the device, the context sensitive content being generated and delivered separately from content associated with the broadcast.

2. The method of claim 1 wherein providing the context sensitive content to the device includes tailoring content provided to or from the device or other performance characteristics of the device based on the user's identity.

3. The method of claim 1 wherein the biometric sensor is a fingerprint sensor, hand sensor, face recognition system, iris scanner or retinal scanner, voice pattern analyzer, or DNA analyzer.

4. The method of claim 1, further comprising transmitting the digital identifier to a remote server connected to the device over a network.

5. The method of claim 1 wherein providing content to the user includes associating a profile of the user with the digital identifier.

6. The method of claim 5 wherein providing content to the user includes generating or selecting the content based on the profile.

7. The method of claim 1 wherein providing the content includes targeting of advertising to the user based on a profile of the user.

8. The method of claim 1 wherein providing the content includes permitting or denying access to the content or the device based on a profile of the user.

9. The method of claim 1 wherein providing the content includes generating a profile of the user based on information provided by the user.

10. The method of claim 1 wherein providing the content includes pushing the content to the device from a remote server.

11. The method of claim 1 wherein providing the content includes registering the device with a remote server.

12. The method of claim 1 wherein providing the content includes pushing in-game advertising to a video game.

13. The method of claim 12 wherein the video game is an online video game running on the device.

14. The method of claim 1 wherein providing the content includes separating user-generated content according to the identity of the user who generated the content.

15. The method of claim 1 wherein providing the context sensitive content to the user includes monitoring user behavior to generate a user profile.

16. The method of claim 1 wherein the device is a television set and providing the context sensitive content to the user includes monitoring television viewing habits of a viewer uniquely identified by the metric.

17. The method of claim 1 wherein the device is used for downloading and playing music or videos and providing the context sensitive content to the user includes recommending music or videos for the user to download.

18. The method of claim 1 wherein the device is used for online gaming and providing the context sensitive content to the user includes tailoring in-game advertising to a particular user identified by the metric.

19. The method of claim 1 wherein the device is a television set and providing the context sensitive content to the user includes generating context-sensitive content and pushing the context sensitive content to the user during presentation of a live television broadcast with the device.

20. The method of claim 19 wherein the context-sensitive content is generated based on the user's viewing preferences.

21. The method of claim 19 wherein the context-sensitive content is generated based on the user's preferences for music or videos as determined from the user's use of other devices having unique user ID capability.

22. The method of claim 1 wherein the device is a computer browsing the internet, wherein providing content to the user includes selecting banner ads based on the users web-browsing habits and displaying them on websites that the user visits.

23. A consumer electronic device, comprising:
a biometric sensor;
a user identification unit configured to uniquely identify a user of the device using a metric that is contingent upon the user using the device for its intended purpose without having to perform a separate step, function, or operation for the express purpose of identifying the user, wherein the user identification unit uniquely identifies the user includes using the biometric sensor to provide the metric by generating a digital identifier associated with a user biometric, wherein the biometric sensor is configured to sense the user biometric during normal operation of the device; and
a content generator configured to provide context sensitive content to the device, wherein the context sensitive content depends on the user's identity, wherein the content generator is configured to push context sensitive content to the user based on the user's patterns of use of the device without requiring the user's personal information, wherein the context sensitive content is presented during a broadcast on a display associated with the device, the context sensitive content being generated and delivered separately from content associated with the broadcast.

24. A non-transitory processor readable medium having embodied therein a set of processor readable instructions configured to implement a method for operating a device upon execution, the method comprising:
uniquely identifying a user of the device using a metric that is contingent upon the user using the device for its intended purpose without having to perform a separate step, function, or operation for the express purpose of identifying the user, wherein uniquely identifying the user includes using the biometric sensor to provide the metric by generating a digital identifier associated with a user biometric, wherein using the biometric sensor includes sensing a user biometric with the biometric sensor during normal operation of the device; and
providing context sensitive content to the device, wherein the context sensitive content depends on the user's identity, wherein providing the context sensitive content includes pushing the context sensitive content to the user based on the user's patterns of use of the device without requiring the user's personal information, wherein the content is presented during a broadcast on a display associated with the device, the context sensitive content being generated and delivered separately from content associated with the broadcast.

25. A consumer electronic device, comprising:
a biometric sensor;
a control module;
a user identification unit incorporated into the control module, wherein the user identification unit is configured to uniquely identify a user of the device using a metric that is contingent upon the user using the device for its intended purpose without having to perform a separate step, function, or operation for the express purpose of identifying the user, wherein the user identification unit uniquely identifies the user includes using the biometric sensor to provide the metric by generating a digital identifier associated with a user biometric, wherein the biometric sensor is configured to sense the user biometric during normal operation of the device,
wherein device is configured to provide context sensitive content to the device, wherein the context sensitive content depends on the user's identity, wherein providing the context sensitive content includes pushing the context sensitive content to the user based on the user's patterns of use of the device without requiring the user's personal information, wherein the context sensitive content is presented during a broadcast on a display associated with the device, the context sensitive content being generated and delivered separately from content associated with the broadcast.

26. The device of claim 25 wherein the device is configured to tailor content provided to or from the device or other performance characteristics of the device based on the identity of the user using the device.

27. The device of claim 25 wherein the biometric sensor is positioned on the control module such that the biometric sensor can sense the biometric during normal operation of the device by the user.

28. The device of claim 25 wherein the biometric sensor is a fingerprint sensor, hand sensor, face recognition system, iris scanner, retinal scanner, voice pattern analyzer, or DNA analyzer.

29. The device of claim 25 wherein the biometric sensor is a fingerprint sensor.

30. The device of claim 29 wherein the fingerprint sensor is located on a control button on the control module.

31. The device of claim 30 wherein the control module is a remote control.

32. The device of claim 30 wherein the control module is a game controller.

33. The device of claim 30 wherein the control module is a computer mouse and the control button is a mouse button.

34. The device of claim 30 wherein the device is a camera and the control button is a shutter button.

35. The device of claim 29 wherein the fingerprint sensor is ergonomically located on the control module in a place where the user's fingers are likely to rest during normal operation of the device.

36. The device of claim 35 wherein the control module is a game controller and the fingerprint sensor is located on a back side of the game controller.

37. The device of claim 25 wherein the device is adapted to separate user-generated content according to the identity of the user who generated the content.

38. The method of claim 1, wherein the device is used for downloading and playing music or videos, wherein pushing context sensitive content to the user includes suggesting music or videos for the user to download.

39. The method of claim 1, wherein the device is used for playing an online game, and wherein pushing context sensitive content to the user includes tailoring in-game advertising to the particular user and then pushing the advertising to the game.

40. The method of claim 39 wherein the advertising is in the form of textures appearing within the context of the game.

41. The method of claim 1, wherein the device is a television set, wherein pushing the context sensitive content to the user includes generating text bubbles containing context-sensitive content that can be pushed to the user during live broadcasts.

42. The method of claim 41, wherein the context-sensitive content is based on the user's viewing preferences.

43. The method of claim 41, wherein the context-sensitive content is based on the user's preferences for music or videos as determined from the user's use of other devices having a unique user ID capability.

44. The method of claim 1, wherein the device is a computer for browsing the internet, wherein pushing context sensitive content to the user includes selecting banner ads based on the user's web-browsing habits and displays the banner ads on websites that the user visits.

* * * * *